Patented May 20, 1952

2,597,721

UNITED STATES PATENT OFFICE 2,597,721

WERNER-TYPE METAL COMPOUNDS AS LAMINATING AND COATING COMPOSITIONS

Max T. Goebel, Landenburg, Pa., and Ralph K. Iler, Cleveland Heights, Ohio, assignors to E. I. du Pont de Nemours & Company, Wilmington, Del., a corporation of Delaware No Drawing. Application July 25, 1950, Serial No. 175,876

9 Claims. (Cl. 154—43)

This invention relates to novel compositions, processes for producing them, and articles coated and bonded with them. More particularly, the invention is directed to complex compounds of the Werner type in which atoms of zirconium are coordinated with monocarboxylic functional acido groups made up of a carboxyl radical joined to an alpha, beta unsaturated carbon chain containing from two to six carbon atoms, the acido groups being coordinated, through the carboxyl radical, with nuclear atoms of zirconium, the complex also containing additional coordinated nuclear atoms of zirconium, the valence and coordination positions of all of the nuclear metal atoms, other than those positions occupied by coordinated functional acido groups, being occupied by groups selected from the class consisting of aquo groups, hydroxyl, and monovalent negative groups which are anions of monobasic acids, and the total number of nuclear metal atoms within the complex being from one to ten times the number of coordinated functional acido groups; is further directed to processes for making these compositions comprising the step of effecting contact, in solution, between a monocarboxylic acid in which the carboxyl is joined to an alpha, beta-unsaturated carbon chain containing two to six carbon atoms, and a basic salt of zirconium and a monobasic acid, the basicity of the salt being no greater than about fifty per cent and the mole proportion of metal to monocarboxylic acid being from 1:1 to 10:1; and is still further directed to articles wherein there is a material containing on its surface above about 5% of an element having an atomic weight of from 14 to 16, inclusive, the material being coated with an ethylenic polymer and a Werner-type complex of the class described.

The desirability of effecting improved bonding between diverse materials has been recognized in a variety of situations. It has been realized that composite structures made up of dissimilar materials could possess the advantageous properties of each of the constituent materials and at the same time have additional, especially desirable properties resulting from the combination, if only suitable ways of effecting permanent joining of the materials could be found. Thus, it was proposed to embed a mass of fibers, such as rayon cord, in a continuous phase of a diverse material, rubber, to produce a structure having the strength of the fibers and the elasticity of the rubber and a combination of properties especially useful in tires. Unfortunately, rubber did not have as high a degree of affinity for rayon as was required, and the lack of bonding was an obstacle in the realization of the expected advantages.

When a material, such as a fiber, is embedded in another material, the latter may be said to adhere by mechanical bonding. The fiber may be squeezed so tightly that no movement at the interface will occur. However, if the fiber is a substance having a hydrophilic surface, and the embedded fiber structure is immersed in water in such a way that contact between the fiber and water is possible, the water may be found to penetrate the mechanical bond and loosen it, so that the strength of the bonds falls off rapidly. In this manner composite structures which have excellent dry strength are rendered unsuitable for purposes where wetting is likely to occur, such as in outdoor exposure.

The present invention is concerned with chemical bonds, in contradistinction to the mechanical bonds above described, and to such bonds which are resistant to the action of water.

Now according to the present invention it has been found that by processes in which contact, in solution, is effected between a monocarboxylic acid having the carboxyl joined to an alpha, beta-unsaturated carbon chain containing two to six carbon atoms, and a basic zirconium salt of a monobasic acid, the basicity of the salt being no greater than about fifty per cent and the mole proportion of zirconium to carboxylic acid being from 1:1 to 10:1, there may be produced novel complex compounds of the Werner type, and that improved properties are found in articles wherein there is a material containing on its surface above about 5% of an element having an atomic weight of from 14 to 16, inclusive, the material being coated with an ethylenic polymer and a Werner-type complex of the class described.

The novel zirconium complex compounds of this invention are coordination compounds of the Werner type and are not to be confused with the normal zirconium salts. Thus, a composition in which the acido groups are coordinated with zirconium differs radically in chemical properties from a composition in which the acido groups are held only by primary valence bonds such as ionic bonds. Such observed differences in properties may be explained on the basis of structure rather than empirical composition, and Werner's theory of complex compounds affords a convenient and logical basis for such an explanation.

According to the Werner theory, atoms may exert auxiliary valences as well as the principal valences occurring in simple compounds. These auxiliary valences may act to hold various groups to the atom exerting them, and the atom exerting the principal and auxiliary valences may become the nuclear atom of a complex compound or complex ion.

It has been found that the total number of groups which ordinarily may be held within the complex by the combined principal and auxiliary valences is six. The groups so held are referred to as "coordinated groups" and zirconium is said to have a "coordination number" of six. Other groups may also be associated with the zirconium, but when this is the case such additional groups are present as ions and are outside of the zirconium-nuclear complex. Moreover, there may be more than one zirconium-nuclear atom within the complex, the zirconium atoms being linked together by reason of being coordinated thru common groups known as bridging groups. With respect to each zirconium atom, each bridging group occupies but a single coordination position, so that an additional five coordination groups may be present on the atom.

In accordance with the above-stated Werner theory, the compositions of this invention may be described as Werner complex compounds characterized by having therein zirconium associated with an organic, monocarboxylic acido group made up of a carboxyl radical joined to an alpha, beta-unsaturated carbon chain containing from two to six carbon atoms. Such acido groups, which for convenience of reference will hereinafter be designated as "functional" acido groups, may be present as simple coordinated groups held by either principal or auxiliary valences, or they may be present as bridging groups between two nuclear zirconium atoms. Particular acido groups may conveniently be designated by adding the suffix "ato" to the first part of the name of the acid corresponding to the acido group. For instance, acrylic acid gives "acrylato" groups, crotonic acid gives "crotonato" groups, and sorbic acid gives "sorbato" groups.

The fact that the functional groups are inside, rather than outside, the coordination spheres of the zirconium atoms probably accounts for the unusual chemical properties of the compositions such as the fact that they are soluble in water and are adsorbed on negatively charged surfaces from aqueous solutions. It will be understood that there may be more than one zirconium atom within the complex and that the zirconium atoms may be held together by bridging groups other than acido groups, so that for each functional acido group there may be several nuclear zirconium atoms within the complex, it being necessary only that within the complex there is at least one nuclear zirconium atom coordinated with a functional acido group. Preferably, however, the number of zirconium atoms per unsaturated organic acido group having less than ten carbon atoms will not be more than about ten.

The functional acido group coordinated with the nuclear zirconium atom in a composition of this invention should be unsaturated. The term "unsaturated" is here used in its ordinary chemical meaning to indicate a carbon-to-carbon multiple bond such as is found, for instance, in ethylene or acetylene. It does not include the aromatic type of linkage found in the benzene ring, but it does include ring unsaturation such as found in the furyl ring of beta furyl acrylic acid. Generically, compounds which possess a "bromine" or "iodine number" by reason of a multiple carbon-to-carbon bond are comprehended by the term "unsaturated" as here used.

The functional acido group may contain a single unsaturated group, as in acrylic acid, or a plurality of such groups, as in sorbic acid. The group may contain a double bond, as in crotonic acid, or a triple bond, as in propiolic acid. The acido group should be monocarboxylic and should be alpha-beta unsaturated. Members of this class include, for instance, acrylic acid and substituted acrylic acids such as crotonic, isocrotonic, alpha and beta ethyl acrylic, angelic, and tiglic, and beta furyl acrylic acids, all of which are hereinafter referred to generically as acrylic acids.

In a composition of this invention the ratio of nuclear zirconium atoms per functional acido group within the complex preferably should be from about 1:1 to about 10:1. When two or more nuclear zirconium atoms are coordinated with a single acido group within the complex, the zirconium atoms may be coordinated with each other thru bridging groups. Various groups may function in this bridging capacity, examples, for instance, being hydroxyl (OH), aquo ($H_2O$), and acido groups, either functional or non-functional.

The groups, other than the functional acido groups, with which zirconium atoms are coordinated in the compositions of this invention are of secondary importance only. These groups preferably should be, from the standpoint of valence, either neutral or monovalent. The neutral groups are of course held by auxiliary valence bonds, aquo groups ($H_2O$) being a typical example. The monovalent groups are negative and are typified by such groups as chloro, bromo, formato, acetato and nitrato groups. It will be observed that groups of this type are characteristic of the anions of monobasic acids and that metal compounds containing them are salts of monobasic acids. Thus, the other groups may be selected from the class consisting of aquo groups, hydroxyl, and monovalent negative groups which are anions of monobasic acids.

Acido groups which are not coordinated with zirconium may, of course, be present. Such groups may be ionizable and may even ionize to give ions of the same acid which is coordinated with zirconium. For instance, in a crotonato chromic chloride there may be present, in addition to the coordinated crotonato group, anions of crotonic acid which can ionize off to give crotonate ions. Similarly, such uncoordinated groups may be anions of inorganic monobasic acids such as hydrochloric acid.

The method of making a novel composition of this invention may be generically described as effecting contact in solution between organic unsaturated acido groups of the type described and basic zirconium salts of monobasic acids, and the basicity of the salts being no greater than about 50%. The processes may be varied considerably as to details depending upon the particular composition which it is desired to produce.

The solvent used may be any substance capable of dissolving the reactants or holding them in solution. Inert solvents such as chlorinated hydrocarbons, and especially carbon tetrachloride, are satisfactory. Water may also be used, although in this case it will generally be desirable to work in as concentrated a solution as possible.

The acido groups taking part in the reaction may be derived from suitable acids such as have already been described above. The functional acido groups may also be derived from salts or esters containing acido groups. For instance, the presence of sorbato groups may be effected by hydrolysis of methyl sorbate, or by acidification of the sodium salt of sorbic acid. It will be understood, of course, that the acido group is not present alone in any case but that the manner in which it is associated in the solution initially is relatively unimportant so long as the dissociation can occur to give the acido group. It has been found that carboxyl groups are particularly effective as coordinating groups and their use constitutes a preferred practice of this invention.

The ratio of nuclear zirconium atoms to coordinated unsaturated carboxylic acido groups in the Werner-type product is proportional to and determined by the ratio of basic zirconium atoms to unsaturated carboxylic acido groups in the reaction mixture. Thus, for a 5:1 ratio of zirconium atoms to crotonato groups in the product, for instance, five atoms of basic zirconium should be used in the reaction mixture for each molecule of crotonic acid. The proportions are similarly adjusted for other ratios within the preferred ratio range of 1:1 to 10:1.

The presence in the reaction mixture of a basic zirconium salt of a monobasic acid may be effected in a variety of ways. One way is to add the previously prepared basic salt. For instance, zirconium oxychloride, $ZrOCl_2 \cdot 8H_2O$ may be added in this manner. Another way is to add an acidic salt and a base, whereby a partial neutralization of the salt takes place with the formation of a basic salt. This reaction may be carried out in a solvent such as an alcohol.

In preparing a basic salt according to this preferred practice certain precautions should be observed. The basic zirconium salts have a marked tendency to coordinate with hydroxyl groups, and by reason of two zirconium atoms coordinating with a single hydroxyl group, to form compounds of high molecular weight, this process being known as "olation." As olation takes place, compositions of high molecular weight are formed which are insoluble or only sparingly soluble in water. To minimize such olation it is ordinarily desirable to use the basic metal salt immediately after its preparation. Thus, in a preferred process the acido group is added immediately after the neutralization has taken place.

The basic zirconium salt should be a salt of a monobasic acid, that is, an acid having a single ionizable hydrogen. The acid may be organic such as acetic or propionic, or it may be inorganic, such as hydrochloric, nitric, or hydrobromic.

The basicity of the zirconium salt should not be greater than 50%. The percentage of basicity of the salt may be defined as a measure of the extent to which hydroxyl ions have replaced the anions of the monobasic acid in the normal salt. For instance, zirconium tetrachloride, $ZrCl_4$, is a zirconium salt of the monobasic acid, hydrogen chloride, having 0% basicity. When the hydroxyl group replaces one of the chlorine atoms a basic salt, $Zr(OH)Cl_3$, theoretically is formed, and since one-fourth of the anionic groups of the monobasic acid has been replaced, this composition is said to be 25% basic. Similarly, if two of the chlorine atoms had been replaced, the compound would be 50% basic. In the present process the basicity of the zirconium salt should not exceed about 50% regardless of whether the salt is added as such or is formed in situ by the reduction of a multivalent zirconium compound. So long as there is any basicity the Werner complex compounds will form, so that the basicity may be only a fraction of 1% if desired.

Having prepared a Werner-type complex compound by such a method as is above-described, one may, according to this invention, employ the composition for chemically bonding diverse materials by processes in which contact is effected between the zirconium of the complex compound and a material having a negatively charged surface, and a material capable of polymerizing through an ethylenic linkage is polymerized in contact with a functional acido group of the complex.

In any bond between two surfaces there are two distinct types of molecular forces involved. The first are physical or Van der Waal's forces commonly having an energy of the order of 2,000 to 10,000 calories per molecule. The second type are chemical or covalent bonds, having an energy of from 10,000 to 200,000. It is the chemical, rather than the physical, type of adhesive bonds with which this invention is concerned.

It will be understood that in any process for adhesively joining two or more materials the materials being joined are essentially in the solid state. For purposes of the present discussion it will be considered that plastic materials, which will flow under definite stress, are essentially in the solid state.

When two solid materials are adhesively joined their surfaces are brought into as close proximity as possible. Where both materials are rigid, almost invariably there is a lack of conformity of the surfaces to each other, so that an intermediate adhesive layer must be employed which is sufficiently fluid to fill the irregularities in the solid surfaces and thereby establish substantial conformity between the surfaces. The mere ability thus to provide a substantially continuous interface between materials to be adhesively joined is not in itself sufficient to make a substance a good adhesive. In addition, the adhesive must have a definite affinity for the surfaces being joined. Where diverse materials, that is, materials having different chemical or physical natures are being joined a special problem is presented because an adhesive having an affinity for one of the materials may have no affinity for the other. This problem has been solved by the present invention according to which it has been found advantageous to treat the unbonded solid surface with a material of dual chemical structure such that one part of the structure will react with the solid surface, and the other part with the adhesive, thus creating a chemical bond. Such intermediate reagent of dual chemical functionality for purposes of the present description, is referred to as a "bonding agent."

It will be apparent that the need for a bonding agent may occur, not only in cases where solids are to be joined by adhesive but also in cases where a plastic coating is to be applied to a solid surface. The plastic coating may of course be applied as a liquid which subsequently is hardened to a solid. The coatings may be quite thin, as a paint or varnish film, or relatively thick, as in the case of rubber-coated objects. The bonding agent may be applied, not only where a thin adhesive layer is used between two solid surfaces, but also where solid fibers such as glass or cords of textiles such as rayon are embedded and thus held in an assembly in a plastic medium such as rubber.

One of the two diverse materials which may be bonded according to a process of this invention is a material having a negatively charged surface. Such materials are characterized by containing a substantial proportion, that is, above about 5%, of an element selected from the group consisting of oxygen and nitrogen, that is, an element having an atomic weight in the range from 14 to 16. These elements may be present in highly polar groups such as, for instance, OH, $NH_2$, —COC—, —NH—, C—O, COOH, and $SO_3H$. Thus, there are included as materials having negatively charged surfaces ceramic materials, vitreous masses, glass, cellulose (such forms as wood, paper, cotton, hemp, cellophane, rayon and cellulose acetate), and polyamide materials, in such forms as wool, silk, gelatin, synthetic protein fibers, leather, and hides. Also included are solid materials bearing oxide or hydroxide film such as may occur on metals.

As the other of the materials which may be bonded there is used a material capable of polymerizing through an ethylenic linkage. Such materials are characterized by being organic substances containing unsaturated carbon-to-carbon bonds. Included are synthetic organic monomers capable of polymerizing to form polymers of high molecular weight and also natural unsaturated substances such as gums and natural resins. Of the synthetic materials, particularly advantageous results are obtained using compounds of the methacrylate type, such as methyl methacrylate.

The bonding operation is carried out by forming a film or layer of the Werner-type zirconium complex compound at the interface between the surfaces of the diverse materials being joined and effecting polymerization of the material capable of polymerizing through an ethylenic linkage in contact with a functional acido group of the complex. The material to be polymerized may be applied as the monomer or as a partially polymerized monomer. The polymerization may be assisted by applying heat and by the presence of polymerization catalysts. The tenacity of the union between the functional acido group of the complex and the polymerized material suggests that interpolymerization occurs between the acido group and the material polymerized, but applicants do not limit their invention to this explanation of the mechanism of the reaction.

The novel articles produced according to this invention are characterized by having therein a material containing on its surface above about 5% of oxygen or nitrogen, the material being selected from the group consisting of vitreous, cellulosic and polyamide materials and metals bearing an oxygen-containing film, and being coated with an ethylenic polymer and a complex compound of the Werner type consisting of a monocarboxylic functional acido group made up of a carboxyl radical joined to an alpha, beta unsaturated carbon chain containing from two to six carbon atoms, the acido group being coordinated, through the carboxyl radical, with a nuclear zirconium atom, the valence and coordination positions of all the nuclear zirconium atoms, other than those positions occupied by coordinated functional acido groups, being occupied by groups selected from the class consisting of aquo groups, hydroxyl, and monovalent negative groups which are anions of monobasic acids, and the total number of nuclear zirconium atoms within the complex being from one to ten times the number of coordinated functional acido groups.

The nature of this invention and its manner of application will be better understood by reference to the following illustrative examples.

*Example I*

A complex composition of this invention, methacrylato zirconium chloride, was prepared in the following manner. A zirconium oxychloride solution was prepared by dissolving 80.5 grams of the octahydrate, $ZrOCl_2 \cdot 8H_2O$ in 50 ml. of water. To this solution there was added 300 ml. of isopropanol. Separately there was prepared an isopropanol solution containing 10.0 grams of sodium hydroxide, 10 ml. of water, and 12.6 grams of 85% methacrylic acid solution. These quantities represent one-fourth mol of zirconium oxychloride and sodium hydroxide, and one-eighth mol of methacrylic acid.

The second solution was then added to the zirconium oxychloride solution and the mixture was refluxed for five minutes. It was then cooled and filtered to remove a trace of insoluble matter. There was thus obtained a solution of a zirconium complex compound of the Werner type.

It will be noted that the zirconium oxychloride used is in fact a basic salt of zirconium, being the equivalent of dehydrated dihydroxy dichloride.

The zirconium complex in the solution was precipitated by adding sufficient 5% sodium hydroxide solution to raise the pH to about 5.5. This precipitate was filtered off, washed with water, dried, and analyzed. It was found to contain 20.57% carbon and 42.43% zirconium, corresponding to a metal to methacrylic acid mole ratio of 1.1:1.

*Example II*

A zirconium complex was made as in Example I with the exception that only one half as much sodium hydroxide was added to the methacrylic acid solution, and the amount of isopropanol used as solvent at this point was twice as large.

The analysis of the caustic-precipitated complex showed 14.72% of carbon and 45.86% of zirconium, by weight, corresponding to a metal:acid mole ratio of 1.6:1.

This application is a continuation-in-part of our copending U. S. application, Serial No. 665,608, filed April 27, 1946, now abandoned.

We claim:

1. A water-soluble complex compound of the Werner type consisting of a monocarboxylic functional acido group made up of a carboxyl radical joined to an alpha, beta-unsaturated carbon chain containing from two to six carbon atoms, the acido group being coordinated, through the carboxyl radical, with a nuclear zirconium atom, the complex also containing additional coordinated nuclear zirconium atoms, the valence and coordination positions of all the nuclear zirconium atoms, other than those positions occupied by coordinated functional acido groups, being occupied by groups selected from the class consisting of aquo groups, hydroxyl, and monovalent negative groups which are anions of monobasic acids, and the total number of nuclear zirconium atoms within the complex being from one to ten times the number of coordinated functional acido groups.

2. A water-soluble complex compound of the Werner type consisting of an acrylic functional acido group made up of a carboxyl radical joined to an alpha, beta-unsaturated carbon chain containing from two to six carbon atoms, the acido group being coordinated, through the carboxyl radical, with a nuclear zirconium atom, the complex also containing additional coordinated nuclear zirconium atoms, the valence and coordination positions of all the nuclear zirconium atoms, other than those positions occupied by coordinated functional acido groups, being occupied by groups selected from the class consisting of aquo groups, hydroxyl, and monovalent negative groups which are anions of monobasic acids, and the total number of nuclear zirconium atoms within the complex being from one to ten times the number of coordinated functional acido groups.

3. In a process for producing a Werner-type water-soluble complex compound in which a monocarboxylic, unsaturated acido group is coordinated through the carboxyl with a nuclear zirconium atom, the step comprising effecting contact, in solution, between a monocarboxylic acid in which the carboxyl is joined to an alpha, beta-unsaturated carbon chain containing from two to six carbon atoms, and a basic zirconium salt of a monobasic acid, the basicity of the zirconium salt being no greater than about fifty per cent and the mole proportion of zirconium to monocarboxylic acid being from 1:1 to 10:1.

4. In a process for producing a Werner-type water-soluble complex compound in which an acrylic acido group is coordinated through the carboxyl with a nuclear zirconium atom, the step comprising effecting contact, in solution, between an acrylic acid in which the carboxyl is joined to an alpha, beta-unsaturated carbon chain containing from two to six carbon atoms, and a basic zirconium salt of a monobasic acid, the basicity of the zirconium salt being no greater than about fifty per cent and the mole proportion of zirconium to monocarboxylic acid being from 1:1 to 10:1.

5. An article wherein there is a material containing on its surface above about 5% of an element having an atomic weight of from 14 to 16, inclusive, the material being coated with an ethylenic polymer and a water-soluble complex compound of the Werner type consisting of a monocarboxylic functional acido group made up of a carboxyl radical joined to an alpha, beta-unsaturated carbon chain containing from two to six carbon atoms, the acido group being coordinated, through the carboxyl radical with a nuclear zirconium atom, the complex also containing additional coordinated nuclear zirconium, the valence and coordination positions of all the nuclear zirconium atoms, other than those positions occupied by coordinated functional acido groups, being occupied by groups selected from the class consisting of aquo groups, hydroxyl, and monovalent negative groups which are anions of monobasic acid, and the total number of zirconium atoms within the complex being from one to ten times the number of coordinated functional acido groups.

6. An article wherein there is a material containing on its surface above about 5% of an element having an atomic weight of from 14 to 16, inclusive, the material being selected from the group consisting of vitreous, cellulosic and polyamide materials and metals bearing an oxygen-containing film, and being coated with an ethylenic polymer and a water-soluble complex compound of the Werner type consisting of a monocarboxylic functional acido group made up of a carboxyl radical joined to an alpha, beta-unsaturated carbon chain containing from two to six carbon atoms, the acido group being coordinated, through the carboxyl radical, with a nuclear zirconium atom, the complex also containing additional coordinated nuclear zirconium atoms, the valence and coordination positions of all the nuclear zirconium atoms, other than those positions occupied by coordinated functional acido groups, being occupied by groups selected from the class consisting of aquo groups, hydroxyl, and monovalent negative groups which are anions of monobasic acids, and the total number of nuclear zirconium atoms within the complex being from one to ten times the number of coordinated functional acido groups.

7. A laminated article with laminae of a material containing on its surface above about 5% of an element having an atomic weight of from 14 to 16, inclusive, the laminae being bonded with an ethylenic polymer and a water-soluble complex compound of the Werner type consisting of a monocarboxylic functional acido group made up of a carboxyl radical joined to an alpha, beta-unsaturated carbon chain containing from two to six carbon atoms, the acido group being coordinated, through the carboxyl radical, with a nuclear zirconium atom, the complex also containing additional coordinated nuclear zirconium atoms, the valence and coordination positions of all the nuclear zirconium atoms, other than those positions occupied by coordinated functional acido groups, being occupied by groups selected from the class consisting of aquo groups, hydroxyl, and monovalent negative groups which are anions of monobasic acids, and the total number of nuclear zirconium atoms within the complex being from one to ten times the number of coordinated functional acido groups.

8. A laminated article with laminae of a material containing on its surface above about 5% of an element having an atomic weight of from 14 to 16, the material being selected from the group consisting of vitreous, cellulosic and polyamide materials and metals bearing an oxygen-containing film, the laminae being bonded with an ethylenic polymer and a water-soluble complex compound of the Werner type consisting of a monocarboxylic functional acido group made up of a carboxyl radical joined to an alpha, beta-unsaturated carbon chain containing from two to six carbon atoms, the acido group being coordinated, through the carboxyl radical, with a nuclear zirconium atom, the complex also containing additional coordinated nuclear zirconium atoms, the valence and coordination positions of all the nuclear zirconium atoms, other than those positions occupied by coordinated functional acido groups, being occupied by groups selected from the class consisting of aquo groups, hydroxyl, and monovalent negative groups which are anions of monobasic acids, and the total number of nuclear zirconium atoms within the complex being from one to ten times the number of coordinated functional acido groups.

9. A laminated article with laminae of glass bonded with an ethylenic polymer and a water-soluble complex compound of the Werner type consisting of an acrylic functional acido group made up of a carboxyl radical joined to an alpha, beta-unsaturated carbon chain containing from two to six carbon atoms, the acido group being coordinated, through the carboxyl radical, with a nuclear zirconium atom, the complex also containing additional coordinated nuclear zirconium atoms, the valence and coordination positions of all the nuclear zirconium atoms, other than those positions occupied by coordinated functional acido groups, being occupied by groups selected from the class consisting of aquo groups, hydroxyl, and monovalent negative groups which are anions of monobasic acids, and the total number of nuclear zirconium atoms within the complex being about from 1 to 10 times the number of coordinated functional acido groups.

MAX T. GOEBEL.
RALPH K. ILER.

REFERENCES CITED

The following references are of record in the file of this patent:

UNITED STATES PATENTS

| Number | Name | Date |
| --- | --- | --- |
| 2,424,262 | Wainer | July 22, 1947 |
| 2,502,411 | Neher et al. | Apr. 4, 1950 |
| 2,544,666 | Goebel et al. | Mar. 13, 1951 |